(12) United States Patent
Beskrovny et al.

(10) Patent No.: US 10,310,956 B2
(45) Date of Patent: Jun. 4, 2019

(54) TECHNIQUES FOR WEB SERVICE BLACK BOX TESTING

(71) Applicant: INTERNATIONAL BUSINESS MACHINES CORPORATION, Armonk, NY (US)

(72) Inventors: Evgeny Beskrovny, Ramat Gan (IL); Omer Tripp, Yorktown Heights, NY (US); Emmanuel Wurth, Muret (FR)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 14/771,472

(22) PCT Filed: Jan. 23, 2014

(86) PCT No.: PCT/IB2014/058492
§ 371 (c)(1),
(2) Date: Aug. 28, 2015

(87) PCT Pub. No.: WO2014/132145
PCT Pub. Date: Sep. 4, 2014

(65) Prior Publication Data
US 2016/0011951 A1    Jan. 14, 2016

(30) Foreign Application Priority Data

Feb. 28, 2013   (GB) .................... 1303562.1

(51) Int. Cl.
*G06F 11/22*   (2006.01)
*G06F 11/36*   (2006.01)
(Continued)

(52) U.S. Cl.
CPC ...... *G06F 11/2294* (2013.01); *G06F 11/3684* (2013.01); *H04L 43/0823* (2013.01); *H04L 43/50* (2013.01); *H04L 67/02* (2013.01)

(58) Field of Classification Search
None
See application file for complete search history.

(56) References Cited

U.S. PATENT DOCUMENTS 6,978,401 B2 * 12/2005 Avvari ............... G06F 11/3676
                                                            714/38.13
7,451,352 B1 * 11/2008 Moore ............... G06F 11/0709
                                                            714/38.14
(Continued)

FOREIGN PATENT DOCUMENTS

CN      103563293 A       2/2014
DE      112012002718 T5   4/2014
(Continued)

OTHER PUBLICATIONS

Siblini et al "Testing web services." Computer Systems and Applications, 2005. The 3rd ACS/IEEE International Conference on. IEEE, 2005. Retrieved on [Jan. 5, 2019] Retrieved from the Internet: URL<https://ieeexplore.ieee.org/abstract/document/1387124> (Year: 2005).*

(Continued)

*Primary Examiner* — Thuy Dao
*Assistant Examiner* — Cheneca Smith
(74) *Attorney, Agent, or Firm* — Michael R. Long; Jeff LaBaw

(57) ABSTRACT

A technique for synthesizing tests from a Web service document includes locating at least one parameter for at least one client to server function call in a Web service document. Client validation constraints for the at least one parameter are discovered. Server validation constraints for the at least one parameter in the Web service document are discovered. At least one range for the at least one parameter that will be accepted by the server and not be accepted by the (Continued)

client is discovered. Tests using parameter values from the discovered at least one range are synthesized.

17 Claims, 8 Drawing Sheets

(51) Int. Cl.
*H04L 12/26* (2006.01)
*H04L 29/08* (2006.01)

(56) References Cited

U.S. PATENT DOCUMENTS

| | | | | |
|---|---|---|---|---|
| 8,429,614 | B2* | 4/2013 | Zhang | G06F 11/3684 714/37 |
| 8,695,098 | B2* | 4/2014 | Pistoia | G06F 21/577 726/25 |
| 8,826,084 | B1* | 9/2014 | Gauf | G06F 11/3688 714/32 |
| 9,118,713 | B2* | 8/2015 | Bisht | G06F 21/53 |
| 2004/0025088 | A1* | 2/2004 | Avvari | G06F 11/3676 714/38.13 |
| 2005/0005163 | A1* | 1/2005 | Kirkpatrick | H04L 67/2819 726/4 |
| 2006/0248511 | A1* | 11/2006 | Sanjar | G06F 11/3664 717/124 |
| 2007/0011650 | A1* | 1/2007 | Hage | G06F 8/38 717/104 |
| 2009/0319832 | A1* | 12/2009 | Zhang | G06F 11/3684 714/38.1 |
| 2012/0198555 | A1 | 8/2012 | Beskrovny et al. | |
| 2013/0007885 | A1 | 1/2013 | Haviv et al. | |
| 2013/0007886 | A1* | 1/2013 | Tripp | H04L 63/1433 726/25 |
| 2013/0007887 | A1 | 1/2013 | Haviv et al. | |
| 2013/0091528 | A1* | 4/2013 | Honda | H04N 21/436 725/85 |
| 2013/0091578 | A1* | 4/2013 | Bisht | G06F 21/53 726/25 |
| 2013/0179979 | A1 | 7/2013 | Pistoia et al. | |

FOREIGN PATENT DOCUMENTS

| | | |
|---|---|---|
| GB | 2505623 A | 3/2014 |
| JP | 2012168764 A | 6/2012 |
| WO | 2013000083 A1 | 1/2013 |

OTHER PUBLICATIONS

Bisht et al. "NoTamper: automatic blackbox detection of parameter tampering opportunities in web applications." 17th ACM conference on Computer and communications security. 2010.Retrieved on [Jan. 5, 2019] Retrieved from the Internet: URL<https://dl.acm.org/citation.cfm?id=1866375> (Year: 2010).*

International Application No. PCT/IB2014/058492, Filing Date: Jan. 23, 2014; The International Search Report and Written Opinion dated Jun. 13, 2014.

* cited by examiner

/* HTML form (client side)*/

4.1 `<form id="EnrollInSchoolForm" runat="server">`
4.2     `<label for="name">Full Name</label>`
4.3     `<label for="age">Age</label>`
4.4     `<input type="text" name="name" id="name"/>`
4.5     `<input type="text" name="age" id="age"/>`
4.6     `<input id="submit" type="button"/>`
4.7 `</form>`

FIGURE 4

/\*\*\* *Client validation (client side)* \*\*\*/

5.1 $(document).ready(function() {
5.2   $("#submit").click(function() {
5.3     var validator=$("#EnrollInSchoolForm").validate({
5.4         rules: {
5.5             age: { required: true, range: [6, 17]
5.6         },
5.7         messages: { name: errName }
5.8     }).form();
5.9   });
5.10 });

FIGURE 5

/* AJAX code (client side) */

6.1 $(document).ready(function() {
6.2 $("#submit").click(function() {
6.3 var myRequest = {
6.4 name: $('#name').val(), age: $('#age').val() };
6.5 var data = JSON.stringify({req: myRequest});
6.6 $.ajax
6.7 ({
6.8 type: "POST",
6.9 url: " MunicipalService.asmx/EnrollInSchoolForm",
6.10 data: data,
6.11 contentType: "application/json; charset=utf-8",
6.12 dataType: "json",
6.13 success: function(msg) { AjaxSucceeded (msg); },
6.14 error: AjaxFailed
6.15 });
6.16 });
6.17 });

FIGURE 6

/\*\*\* *XSD schema in WSDL file (server side)* \*\*\*/

7.1 <xs:element name="age">
7.2     <xs:simpleType>
7.3         <xs:restriction base="xs:integer">
7.4             <xs:minInclusive value="0"/>
7.5             <xs:maxInclusive value="120"/>
7.6         </xs:restriction>
7.7     </xs:simpleType>
7.8 </xs:element>

FIGURE 7

TECHNIQUES FOR WEB SERVICE BLACK BOX TESTING

This application is a national stage of International Application No. PCT/IB2014/058492, which was filed on Jan. 23, 2014, and claims priority to United Kingdom Patent Application 1303562.1, entitled "WEB SERVICE BLACK BOX TESTING," filed on Feb. 28, 2013. The disclosures of International Application No. PCT/IB2014/058492 and United Kingdom Patent Application 1303562.1 are hereby incorporated herein by reference in their entirety for all purposes.

BACKGROUND

This application is generally directed to Web service black box testing and, more particularly, to synthesizing effective payloads for black box testing of Web services.

Web services are a central component in the design of Web systems. A Web service may provide remote online functionality to Web applications and other Web services. Automated black box testing of Web services for functional problems (for example, security vulnerabilities) is a challenge, even compared to black box testing of Web applications. A key reason for this is that the return value of a Web method in a Web Service is typically a primitive value like an integer or a Boolean (though in principle the Web method may return an arbitrary object). This is unlike a Web application iteration where the returned result of an Internet hypertext transfer protocol (HTTP) request is an HTTP response that can be analyzed to determine whether the test payload was successful.

A significant gap in expressiveness between an HTTP response and a primitive value hinders the applicability of black box validation techniques from testing of Web applications to Web services. In sum, there is simply not enough information in the result of a Web service to make any educated or principled estimation about the success of an attack. A classic example of this, from the space of security testing, is checking for cross-site scripting (XSS) vulnerabilities, where Web application validation checks whether an input payload (a script) is contained in a hypertext markup language (HTML) document returned by the Web application. The same test cannot be performed if the returned value is a number as is likely for a Web service.

The only way of getting sufficient feedback from a Web service, such that black box validation can be applied, is if the Web service is driven into an error condition, in which case its return value is normally an error message that often contains data from the input payload. The data published as part of the response can then be subjected to validation, for example, by looking for the input script in the error message.

Naturally, however, the error message would be considered interesting only if it is due to an illegal behavior within the business logic of the Web service. Otherwise, if the cause of the exception is a superficial validation step in the outer layers of the Web service, where the scanner has not exercised the "true" functionality of the Web service, testing is shallow and incomplete. For example, such an exception can occur during parsing of an incoming input message or when checking whether a number is within legal bounds.

BRIEF SUMMARY

Disclosed are a method, a data processing system, and a computer program product (embodied in a computer-readable storage device) for Web service black box testing.

A technique for synthesizing tests from a Web service document includes locating at least one parameter for at least one client to server function call in a Web service document. Client validation constraints for the at least one parameter are discovered. Server validation constraints for the at least one parameter in the Web service document are discovered. At least one range for the at least one parameter that will be accepted by the server and not be accepted by the client is discovered. Tests using parameter values from the discovered at least one range are synthesized.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIGS. 4, 5, 6 and 7 are code examples according to embodiments of the present disclosure.

DETAILED DESCRIPTION

Figure 1:
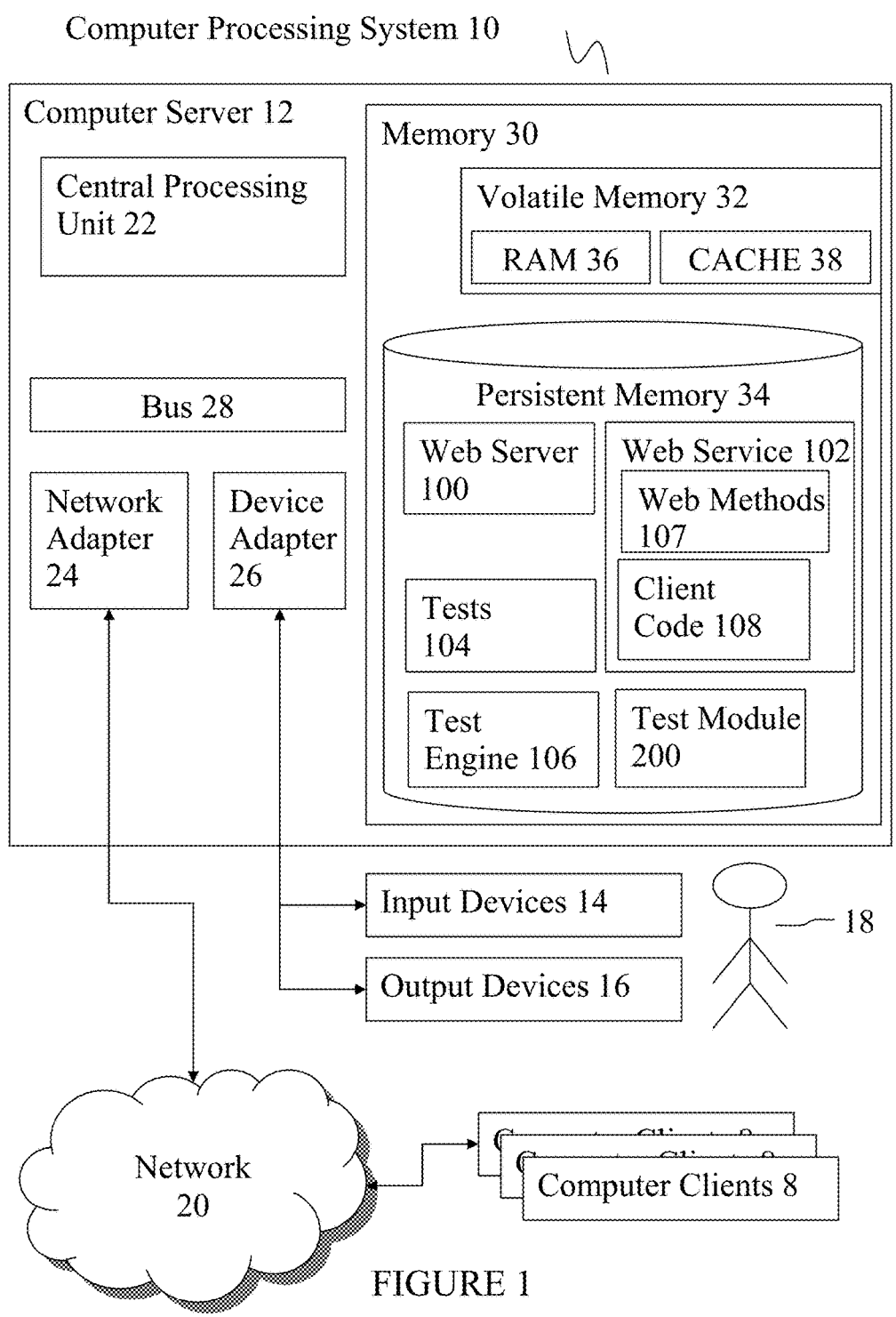
FIG. 1 is a deployment diagram according to one embodiment of the present disclosure.

The illustrative embodiments provide a method, data processing system, and a computer program product (embodied in a computer-readable storage device) for Web service black box testing.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices.

According to one embodiment, a method of synthesizing tests from a Web service document comprises: locating at least one parameter for at least one client-server function call in a Web service document; discovering client validation constraints for the at least one parameter; discovering server validation constraints for the at least one parameter; and discovering a range for the at least one parameter that will be accepted by the server and not be accepted by the client.

According to one embodiment of the present disclosure, a method for synthesizing inputs for black box testing of Web services ensures that an input payload reaches Web service business logic and a Web service is driven into an illegal state, thereby returning an error message that is amenable to black box validation. An assumption in the disclosed embodiments is that client side code that uses a Web service is available for inspection. What makes this assumption natural is that often a Web service is tested as part of a Web application consuming its services. In at least one embodiment, client code is part of a Web service (before it is sent to a client), but in other embodiments client code may not be physically part of a Web service.

Given the above assumption, the disclosed techniques simultaneously consider constraints enforced by a client and constraints enforced by a Web service, such that a range of data values "falling in the gap" between client side and server side validation can be obtained. These values are interesting since: being compatible with server side constraints they pass through an outer layer of the Web service and into business logic; and being incompatible with client side constraints they are often illegal in practice, thereby resulting in an error condition.

To appreciate this observation, the reasons for discrepancies between client side and server side validation in Web services are explained and, in particular, the reason why server side validation is often less than approximate (that is, admits values that trigger an error state). First, constraints on Web methods are often generated automatically based on the parameters types in a Web service Web service definition language (WSDL) document and/or its associated schema. For example, if a parameter for human objects is of type "age", then the parameter value will likely be in the range 0-120 years from the server perspective, whereas the client application may expect a more limited range of 6-18 years denoting the age of a school student. The client application may enforce such a restricted range. Second, the constraints are typically created once per Web service (for all methods in the WSDL file) or even for multiple Web services using shared libraries, and so need to be compatible for all parameters in all Web methods.

A test comprises a Web request involving a parameter having a value or range. For instance, one might request all people having an age between 18 and 21 years. In one embodiment a Web service comprises Web methods that are the server side of the Web service and are located in a Web service document or a WSDL document. In one or more embodiments, all method calls in client side code of a Web service document are analyzed for constrained parameters. In various embodiments, tests are built using parameter values from a discovered range. In one or more embodiments, the tests are executed and any errors generated are recorded. In an embodiment, known modifications to the generated errors are searched for and the Web service is changed in accordance with the modifications. Embodiments can lead to a physical correction of a Web service carried on outside a computer when an error is detected. Embodiments operate below the level of the Web service at the machine level of a computer so that a Web Service has no knowledge that it is under test.

According to another aspect a system for synthesizing tests from a Web service document includes: a function call identifier for locating at least one parameter for at least one client to server function call in a Web service document; a client constraint discovery engine for discovering client validation constraints for the at least one parameter; a server constraint discovery engine for discovering server validation constraints for the at least one parameter; a range identifier for discovering a range for the at least one parameter that will be accepted by the server and not be accepted by the client; and a test synthesizer for building tests using values in the identified range.

According to another aspect, a computer program product for formulating tests from a Web service document, includes: a computer-readable storage medium having computer-readable program code embodied thereon. The computer-readable program code, when executed by a data processing system, is configured to perform the processes described herein. In at least one embodiment, the computer program product comprises a series of computer-readable instructions fixed on a tangible medium, such as an optical disk, a magnetic disk, or a solid-state drive. The series of computer readable instructions embodies all or part of the functionality previously described herein. Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

According to another aspect, a computer program stored on a computer readable medium and loadable into the internal memory of a digital computer, comprising software code portions, when the program is run on a computer, performs the processes described herein. In another embodiment, a data carrier comprises functional computer data structures which, when loaded into a computer system (data processing system) and operated upon thereby, cause the computer system to perform the disclosed processes. A suitable data-carrier could be a solid-state memory, a magnetic drive, or an optical disk.

Referring to FIG. 1, the deployment of an embodiment in a computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

As is illustrated, computer processing system 10 includes: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: a central processing unit (CPU) 22; network adapter 24; device adapter 26; bus 28 and memory 30. CPU 22 loads machine instructions from memory 30 and performs machine operations in response to the instructions. Such machine operations include: increment or decrement a value in register (not shown); transfer a value from memory 30 to a register or vice versa; take instructions from a different location in memory if a condition is true or false (also known as a conditional branch instruction); and add or subtract the values in two different registers and put the result in another register. A typical CPU can perform many different machine operations. A set of machine instructions is called a machine code program. Machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for facilitating communication between the computer server 12 and network devices. Device adapter 26 is connected to bus 28 and input devices 14 and output devices 16 for facilitating communication between computer server 12 and input devices 14 and output devices 16. Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD), or Blu-ray. In such instances, each can be connected to bus 28 by one or more data media interfaces.

As will be further depicted and described below, memory 30 may include at least one program product having a set (for example, at least one) of program modules that are configured to carry out the functions of the disclosed embodiments. The set of program modules configured to carry out the functions of the various embodiments comprises: a Web server 100; a Web service 102; tests 104; a test engine 106, and a test module 200. Additional program modules that support the various embodiments are not shown, but include firmware, a boot strap program, an operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components may be used in conjunction with computer processing system 10. Examples, include, but are not limited to: microcode, device drivers, redundant processing units, external disk drive arrays, redundant array of independent disks (RAID), tape drives, and data archival storage systems. Web server 100 enables computer server 12 to execute Web services such as Web service 102 in order to provide services to computer clients 8. A computer client is similar to computer server 12 and connected via network 20 to computer server 12.

Web service 102 is a document comprising instructions to instruct Web server 100 how to operate in order to provide a defined service to a client. Web service 102 comprises Web methods 107 and client code 108. Web methods 107 are server side methods that deal with requests from client code 108. Client code 108 is client side application code that is sent to a requesting client after an initial request from a client for Web service 102. During normal operation client code 108 is executed on a computer client that is a different physical device to the computer server. When executing on a computer client, client code 108 communicates with Web methods 107 on the computer server to perform the defined service. Tests 104 are, at their simplest, Web requests synthesized by test module 200 and executed by a test engine 106 in order to initiate and control communication with a Web service. Often the tests simulate a client executing client code 108. Test engine 106 executes tests 104 in order to simulate a client using the Web service. Test module 200 synthesizes tests 104 for use by test engine 106.

Figure 2:
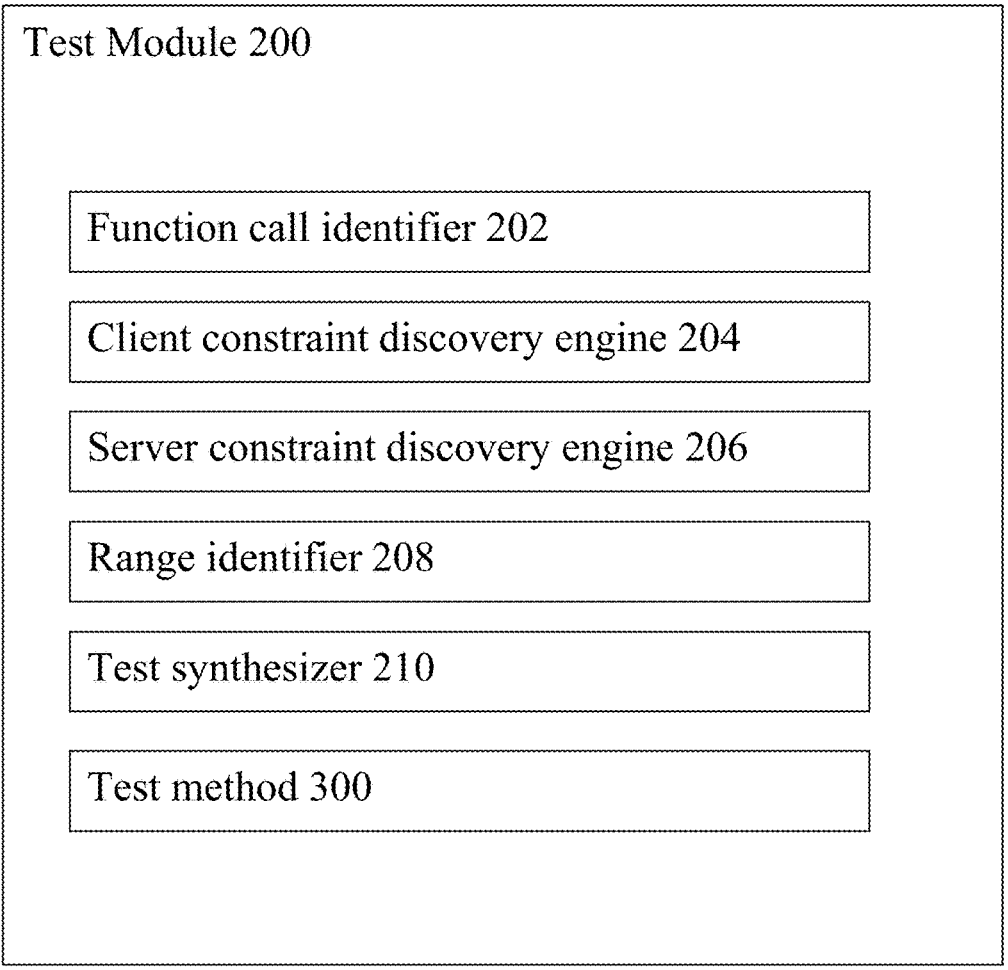
FIG. 2 is a component diagram according to one embodiment of the present disclosure.

Referring to FIG. 2, test module 200 comprises: function call identifier 202; client constraint discovery engine 204; server constraint discovery engine 206; range identifier 208; test synthesizer 210; and test method 300. Function call identifier 202 is configured to scan a Web service document for identify function calls between client and server code with corresponding parameters. Client constraint discovery engine 204 is configured to discover client code validation constraints within the client side code of Web service document for the corresponding parameters. Server constraint discovery engine 206 is configured to discover server code validation constraints within the server side code of the Web service document. Range identifier 208 is configured to calculate the range or ranges of parameter values, for each identified corresponding parameter, that are satisfied by the server constraints and not satisfied by the client constraints. Test synthesizer 210 is configured to build tests from the identified range or ranges of parameter values.

Figure 3:
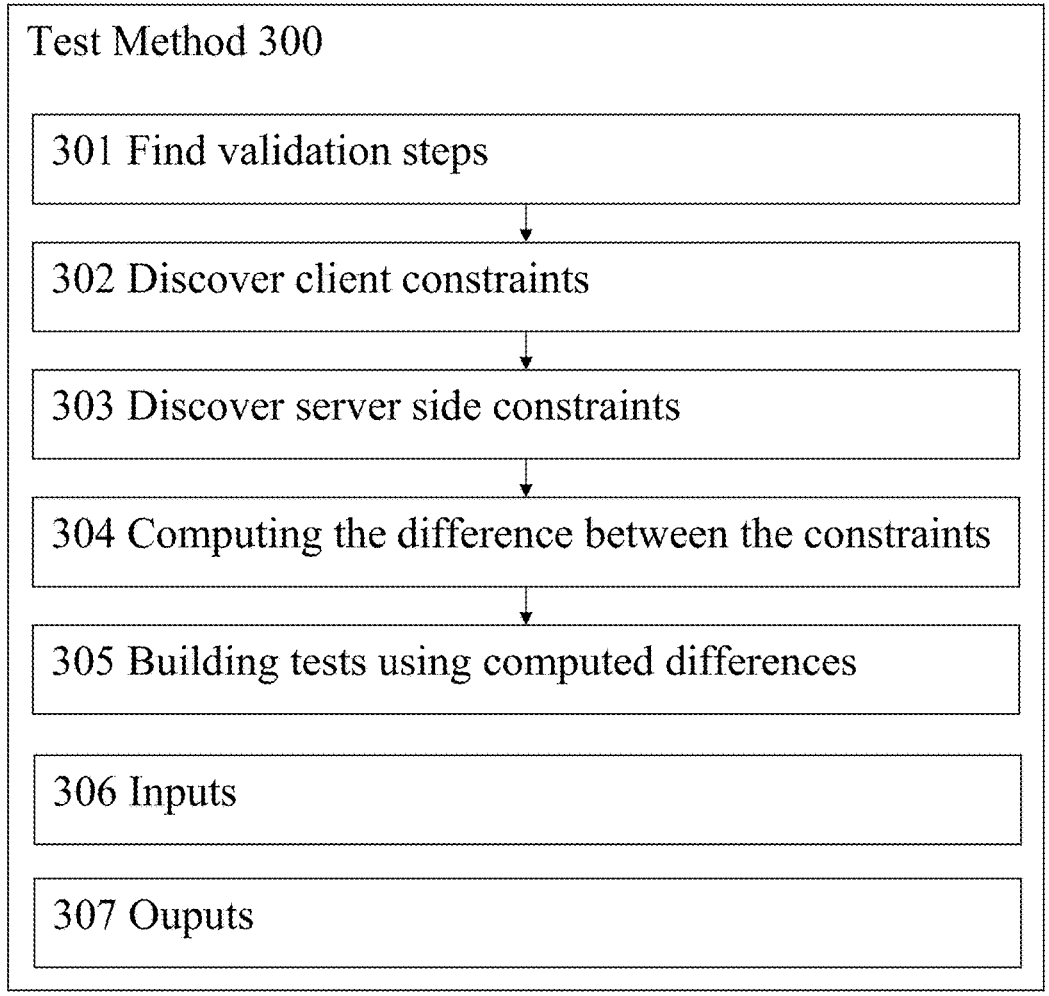
FIG. 3 is a flow diagram of a process according to one embodiment of the present disclosure.

Test method 300 is configured to control the components of test module 200 using a series of logical processes described below. Referring to FIG. 3, test method 300 comprises logical process blocks 301 to 305; inputs 306; and output 307. Inputs 306 comprise Web service 102; Web methods 107; and client code 108. Output 307 comprises the difference between the server side and client side constraints. Block 301 is configured to analyze each function call in client code 108 to find, using static analysis, parameters and validation steps that are performed as part of the call. One way of doing this is by identifying validation functions within the client code (typically HTML validation functions) and checking for data dependencies between the validators and the parameters used. Client side validators often use standard framework based micro-validators and/or regular-expression matching on user inputs, and can thus be detected by simple comparison.

Block 302 is configured to locate one or more validators that govern each client function call and subsequently to discover client constraints on the parameters in the function call by applying static analysis to the one or more validators. For regular expressions constraining parameters of a string type, regular expressions describing all legal inputs are derived. For interval checks or other bounds constraining numeric parameters, parameter ranges are derived using interval analysis. Parameters that violate client side validation are expected to cause errors both at the level of server side extended markup (XML) schema validation and within the business logic of the Web service.

Block 303 is configured to discover server side constraints for parameter values in Web methods 107. These are defined in Web service 102, and may also appear in a policy file associated with a Web service. Parameters violating the server side constraints will not reach the business logic, causing an error during XML validation during processing of an incoming message. Block 304 is configured to compute a pass range as the difference between the client side and server side constraints on input parameters. The pass through range is a range of inputs that will arrive at the business logic and lead to execution at the client level. Block 305 is configured to synthesize one or more tests using test values in the pass range.

Referring to FIGS. 4, 5, 6, and 7, exemplary operations are described with respect to code examples. Line numbers in the code examples are for reference purposes only and do not form part of the code. Referring to FIG. 4, client application 108 is illustrated as a hypertext markup language (HTML) form that is sent to a client as part of a service request.

4.1 defines an HTML form called "EnrollInSchoolForm";
 4.2 defines a label for parameter "name";
 4.3 defines a label for parameter "age";
 4.4 defines text as the input type for the parameter "name";
 4.5 defines text as the input type for the parameter "age";
 4.6 defines a button as an input having a submit id;
 4.7 is the end of the form definition.

Referring to FIG. 5, exemplary client validation code that is part of client application 108 is illustrated.

5.1 defines a function associated with the Web service;
 5.2 defines a function associated with the submit button defined in the HTML code;
 5.3 defines a validator for the "EnrollInSchoolForm";
 5.4 said validator having the following rules;
 5.5 whereby the age must be in the range 6 to 17;
 5.6 end of validator;
 5.7 if not valid then send an error message "errName";
 5.8 end;
 5.9 end;
 5.10 end.

Referring to FIG. 6, exemplary asynchronous script code (in this case Asynchronous JavaScript (AJAX)) that is part of client code 108 for calling Web methods 107 is illustrated.

6.1 defines a function associated with the Web service;
 6.2 defines a function associated with the submit button defined in the HTML code, as opposed to the previous client side validation, this function will call a server side validation method;
 6.3 defines a name for the function;
 6.4 defines the parameters to be sent to the Web server;
 6.5 serialized the parameters to be sent to the Web server;
 6.6 prepares to send a message;
 6.7 prepares message characteristics;
 6.8 defines send type;
 6.9 defines the universal resource location;
 6.10 defines the contents of a message;
 6.11 defines message content type;
 6.12 defines message data type;
 6.13 defines success conditions;
 6.14 defines error conditions;
 6.15 end;
 6.16 end;
 6.17 end.

Referring to FIG. 7, an exemplary server side schema extended mark up language schema (XSD) taken from Web service 106 is illustrated.

7.1 defines a schema for the element "age";
 7.2 defines that the schema is a simple type;
 7.3 defines that the element is an integer;
 7.4 defines the minimum value as inclusive of zero;
 7.5 defines the maximum value as inclusive of 120;
 7.6 end;
 7.7 end;
 7.8 end.

The code includes an AJAX call (line 6.9) to Web method MunicipalService.asmx/EnrollInSchoolForm which uses the input values of parameters name and age. The age parameter is also accessed from the validation code of FIG. 5 which uses standard micro-validators. Data dependencies exist because both functions access the same input variables and, as such, the validation function is relevant to constrain the values of parameter age used in calls to MunicipalService.asmx/EnrollInSchoolForm. The client range checks are analyzed statically, and corresponding constraints are derived on the value of parameter age. In code line 5.5 of FIG. 5, parameter age is bound to range [6 to 17]. The parameter name is not constrained. Server side constraints, found in code line 7.4 and 7.5 of FIG. 7, are retrieved. In the example, the Web service defines type Age, whose corresponding range of values is 0 to 120. The intersection between the client side constraints and server side constraints is computed. The resulting ranges are [0 to 6] and [17 to 120]. If the parameter age contains values from one of these ranges, then it will pass the server side validation and reach the business logic, where it will cause an error since the value is outside the [6 to 17] range.

Figure 8:
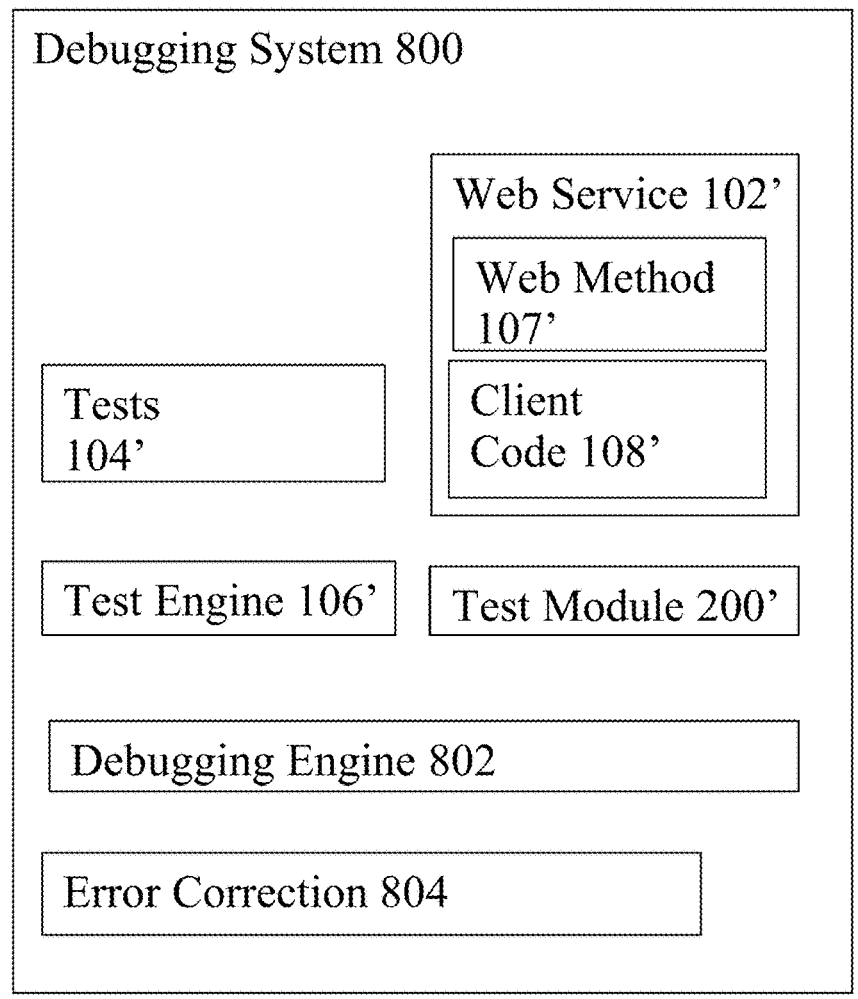
FIG. 8 is a component diagram according to another embodiment of the present disclosure.

Referring to FIG. 8, a further embodiment of the invention comprises a standalone debugging system 800 that integrates test module 200', Web service 102'; tests 104'; test engine 106' with debugging engine 802 and error correction engine 804. In this embodiment, the components labeled as primes are similar to unprimed components in the embodiment of FIG. 1. In the embodiment of FIG. 8, test module 200' is operational during real-time code development rather than at runtime. Debugging engine 802 is configured to send messages to a developer when errors are found in the Web service under development. Error correction engine 804 is configured to match any error with a suggested fix and have debugging engine 802 send it to the developer.

It should be clear to one of ordinary skill in the art that all or part of the logical process blocks may be alternatively embodied in a logic apparatus, or a plurality of logic apparatus, comprising logic elements arranged to perform the logical blocks and that such logic elements may comprise hardware components, firmware components, or a combination thereof. It should be equally clear to one of skill in the art that all or part of the logic components may be alternatively embodied in logic apparatus comprising logic elements to perform the disclosed blocks, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, a computer implemented method of deploying a service comprises deploying computer program code operable to, when deployed into a computer infrastructure and executed thereon, cause a computer system to perform the disclosed blocks. It should be appreciated that the disclosed processes and components may alternatively be embodied fully or partially in a parallel computing system comprising two or more processors for executing parallel software. It should be clear to one skilled in the art that many improvements and modifications can be made to the foregoing exemplary embodiments without departing from the scope of the present invention.

Accordingly, techniques have been disclosed herein that advantageously facilitate Web service black box testing.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of synthesizing tests from a Web service document, comprising:
    locating, using a data processing system, at least one parameter for at least one client to server function call in a Web service document;
    discovering, using the data processing system, client validation constraints for the at least one parameter;
    discovering, using the data processing system, server validation constraints for the at least one parameter;
    discovering, using the data processing system, at least one range for the at least one parameter that will be accepted by the server and not be accepted by the client; and
    synthesizing, using the data processing system, one or more tests using parameter values from the at least one range, wherein the values in the at least one range pass server side validation and reach Web services business logic which causes an error to be generated in response to execution of the tests, and wherein a function call identifier analyzes calls in client side code of the Web service document for constrained parameters and the values in the at least one range fall within a gap between client side validation range and server side validation range.

2. The method of claim 1, further comprising: executing the tests and recording any errors generated.

3. The method of claim 2, further comprising:
    identifying a best modification from known modifications for a generated error and changing the Web service document in accordance with the best modification.

4. The method of claim 1, wherein an error is detected during realtime Web service development.

5. The method of claim 4, wherein an error correction for the detected error is suggested.

6. The method of claim 5, wherein the suggested error correction is applied to the Web service document.

7. A computer system configured to synthesize tests from a Web service document, comprising: a memory; and
    one or more processors coupled to the memory, wherein the processors are configured to implement:
    a function call identifier configured to locate at least one parameter for at least one client to server function call in a Web service document;
    a client constraint discovery engine configured to discover client validation constraints for the at least one parameter;
    a server constraint discovery engine configured to discover server validation constraints for the at least one parameter;
    a range identifier configured to discover at least one range for the at least one parameter that will be accepted by the server and not be accepted by the client; and a test synthesizer configured to build one or more tests using values in the at least one range, wherein the values in the at least one range pass server side validation and reach Web services business logic which cause an error to be generated in response to execution of the tests, and wherein the function call identifier analyzes calls in client side code of the Web service document for constrained parameters and the values in the at least one range fall within a gap between client side validation range and server side validation range.

8. The system of claim 7, wherein the processors are further configured to implement:
a test engine configured to execute the tests and record any errors generated.

9. The system of claim 8, wherein the processors are further configured to implement:
an error correction engine configured to search for one or more known modifications to a generated error and change the Web service document in accordance with the modifications.

10. The system of claim 7, wherein an error is detected during realtime Web service development.

11. The system of claim 10, wherein an error correction for the detected error is suggested.

12. The system of claim 11, wherein the suggested error correction is applied to the Web service document.

13. A computer program product for synthesizing tests from a Web service document, the computer program product comprising:
a computer-readable storage device; and
computer-readable program code embodied on the computer-readable storage device, wherein the computer-readable program code, when executed by a data processing system, configures the data processing system to:
locate at least one parameter for at least one client to server function call in a Web service document;
discover client validation constraints for the at least one parameter;
discover server validation constraints for the at least one parameter in the Web service document;
discover at least one range for the at least one parameter that will be accepted by the server and not accepted by the client; and
synthesize one or more tests using parameter values from the at least one range, wherein the values in the at least one range pass server side validation and reach Web services business logic which causes an error to be generated in response to execution of the tests, and wherein a function call identifier analyzes calls in client side code of the Web service document for constrained parameters and the values in the at least one range fall within a gap between client side validation range and server side validation range.

14. The computer program product of claim 13, wherein the computer-readable program code, when executed by the data processing system, further configures the data processing system to:
execute the tests and record any errors generated.

15. The computer program product of claim 14, wherein the computer-readable program code, when executed by the data processing system, further configures the data processing system to:
identify a best modification from known modifications for a generated error and change the Web service document in accordance with the best modification.

16. The computer program product of claim 13, wherein an error is detected during real-time Web service development.

17. The computer program product of claim 16, wherein an error correction for the detected error is suggested, and wherein the suggested error correction is applied to the Web service document.

\* \* \* \* \*